Aug. 2, 1960 H. L. AMBEAU 2,947,337
TRACTION DEVICE
Filed April 23, 1957 2 Sheets-Sheet 1
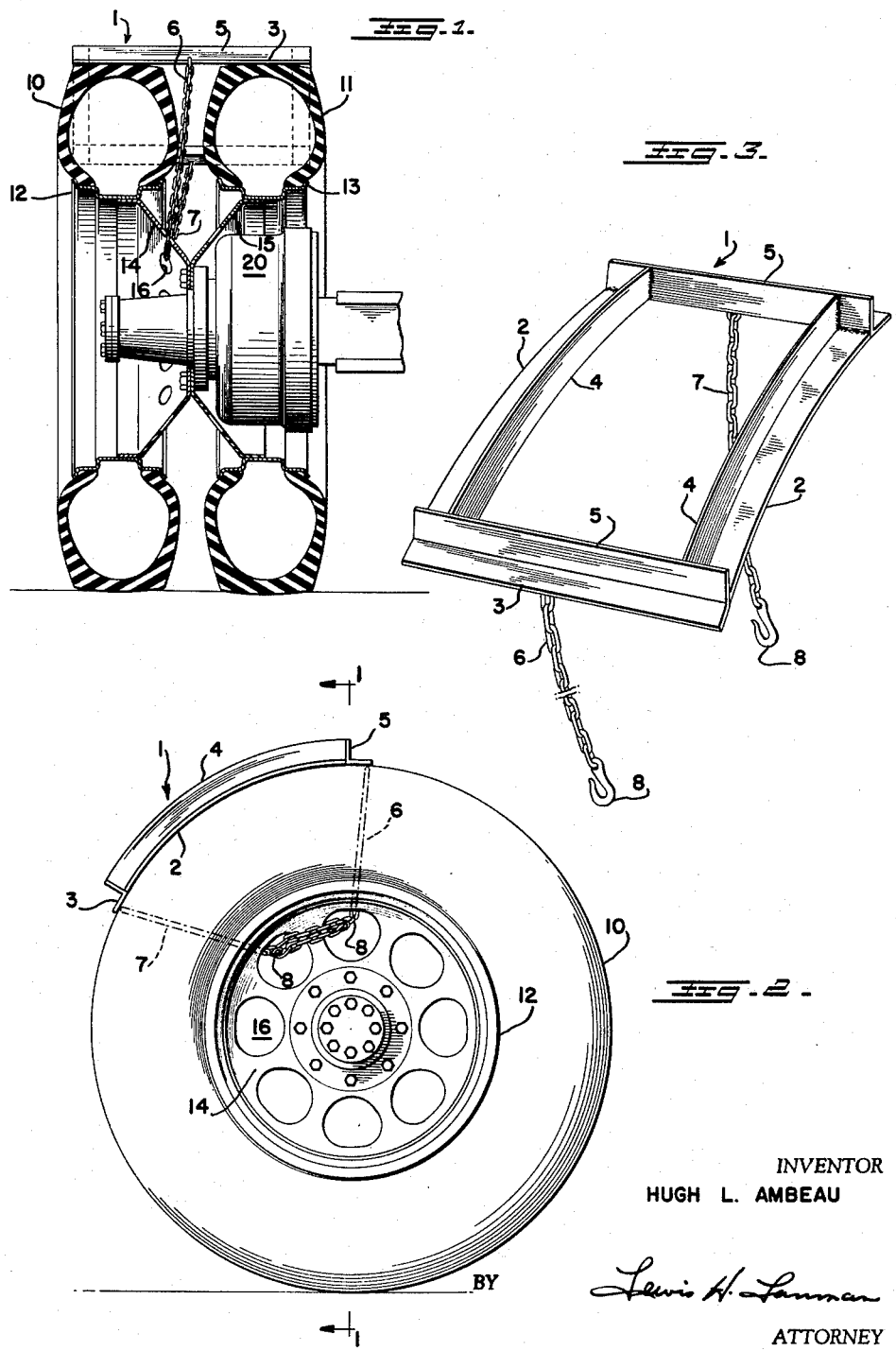
INVENTOR
HUGH L. AMBEAU
BY
ATTORNEY

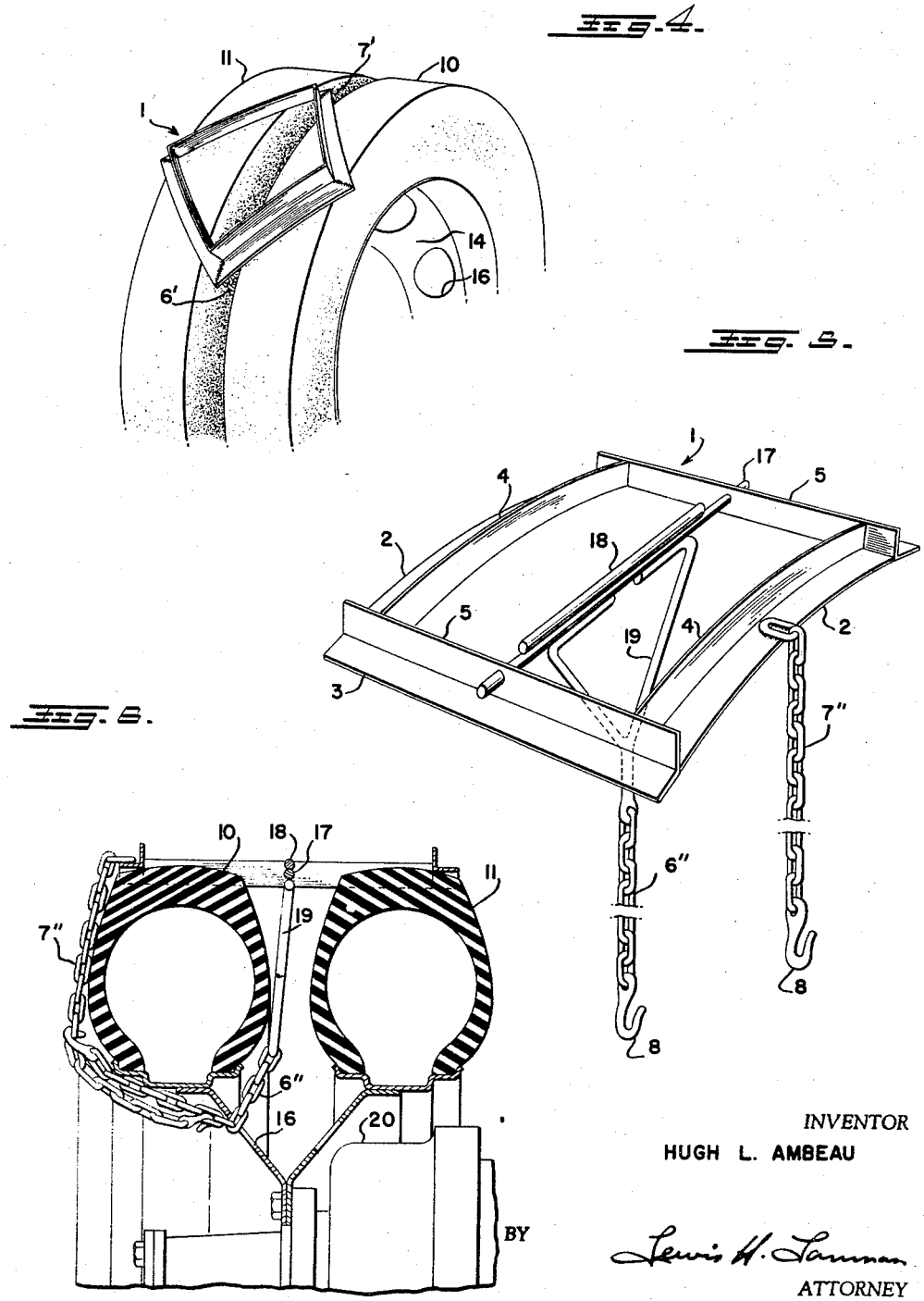

United States Patent Office 2,947,337
Patented Aug. 2, 1960

2,947,337
TRACTION DEVICE
Hugh L. Ambeau, 600 Berard St., Breaux Bridge, La.

Filed Apr. 23, 1957, Ser. No. 654,491

7 Claims. (Cl. 152—220)

The present invention relates to a detachable traction device for vehicle wheels. More particularly the invention relates to a cleat which is readily attached to a dual wheel assembly to provide traction across the entire transverse dimension of wheel to ground contact area.

Many traction devices for vehicle wheels are known, which when attached on the tread surfaces of the tires mounted on the vehicle wheels, provide improved traction and act as non-skidding or anti-skidding devices. Notable among such devices are ordinary snow chains and the like. In many instances, however, such devices are difficult to attach even to a single wheel so as to be secured tightly to the tire tread surface. The vehicle often has to be run onto the traction device, as in the case of chains, or proper attachment necessitates jacking the vehicle wheel to provide clearance for fitting the device onto the tread surface and securing it to the wheels.

This problem is accentuated with respect to dual wheel structures in which the load bearing portions are of modern disc design, where the perforations or openings in the outer wheel disc are accessible and may be utilized in securing such a traction device, but the perforations of the inner wheel disc are substantially inaccessible due to the position of the brake drum. Accordingly, to attach previously proposed traction devices to such dual wheels would necessitate removal of the outer wheel or jacking of the wheel. Such measures are not feasible or even possible where the vehicle or truck is already bogged down in mud, sand, or other soft ground.

It is a primary purpose and object of the invention to provide a traction device particularly adapted for ready attachment to dual wheels of trucks or other dual wheeled vehicles which may be securely fastened to the wheel without jacking of the wheel, or removal of the outer wheel.

It is a further object to provide a traction device or mud cleat for dual wheel vehicles which may be quickly and easily fitted onto the tread surface and secured by fastening to only one wheel after the vehicle is bogged down or stuck in mud, sand or other soft material.

It is a more specific object of the invention to provide a detachable mud cleat for dual wheel assemblies which is fastened only to the outer wheel, but which spans the entire lateral dimension of the dual wheel and provides traction across the entire dual tread to ground contact area.

The traction device or mud cleat of the invention generally comprises a polygonal frame member, preferably curved longitudinally to conform to the tire curvature, and providing bearing surfaces engaging the tire tread. The frame member also carries upstanding flanges at least on the transverse portions thereof providing traction surfaces extending above the tire-engaging surfaces of the frame member. The frame member, regardless of configuration, spans or extends across the lateral dimension of a dual wheel assembly at one or more points. Fastening means, such as chains, are secured intermediately of the lateral span of the frame member, preferably at the longitudinal ends thereof, and are adapted to be passed between the dual wheels and through the disc openings in the outer wheel. This construction permits attaching and securing of the cleat in a matter of seconds after the vehicle is stuck or bogged down and without jacking of the wheels or removal of the outer wheel.

The invention is described in greater detail in conjunction with the accompanying drawings, which illustrate particular or preferred embodiments of the invention, but are not intended to constitute a limitation thereof, in which, Figure 1 is an end elevational view of the mud cleat of the invention attached to a dual wheel assembly shown partially in vertical section and partially in elevation;

Figure 2 is a side elevational view of the cleat attached to a dual wheel, the outer wheel being shown in elevation with the fastening chain passing through adjacent wheel disc openings;

Figure 3 is a perspective view of a preferred embodiment of the mud cleat;

Figure 4 is a perspective view of an alternative form of cleat shown attached to a dual wheel;

Figure 5 is a perspective view of another form of cleat having a pivoted rib with an extension to which one of the fastening chains is attached; and Figure 6 is an end elevational view of the cleat of Figure 5 in position on a dual wheel shown partly in section and partly in elevation.

Referring to Figure 3, the mud cleat of the invention comprises frame member 1 formed from a pair of longitudinal base elements 2 having a radius of curvature to conform to the curvature of the tire tread on the vehicle wheel, and a pair of flat transverse base elements 3, which together provide tire tread-engaging bearing surfaces. Carried on the longitudinal base elements are vertical flanges 4, and the transverse base elements carry vertical flanges 5. These flanges provide the tractive resistance to enable a dual wheeled vehicle to pull out of mud, sand or other soft surface contacted by the wheel. Fastening chains 6 and 7 are positioned on the transverse flanges 5 intermediate the ends thereof, and preferably at the midpoints as shown in Figure 1. The other ends of the chains are provided with hooks 8 so that each chain may be positively fastened to the other at two points.

Referring to Figures 1 and 2, the cleat of the invention is shown as it is attached to a typical dual wheel in which the load bearing portions are of disc design. The frame member or cleat 1 is simply laid upon any exposed portion of the surfaces of the tires 10 and 11 mounted on rims 12 and 13 of outer and inner wheel discs 14 and 15, respectively. As noted in Figure 1, the frame member or cleat extends across the entire transverse dimension of the dual wheels to provide traction across the entire dual tread to ground contact and at the same time the bearing area between cleat and tread is equally distributed on both of the dual wheel tires.

The fastening chains 6 and 7 secured at the midpoints of transverse flanges 5 are passed downwardly between the dual wheel tires as shown in Figure 1 and the ends are passed through different openings 16 in the outer wheel disc 14. The free ends of the chains carrying hooks 8 are then secured in links of the other chain length to tightly secure the cleat to the dual wheel assembly.

In Figure 4 a cleat of diamond configuration is shown with the securing chains 6 and 7 attached to the front and rear points of the frame member.

Figures 5 and 6 show a cleat similar in basic construction to that of Figure 1 except a longitudinal pin 17 is pivoted on the frame 1 intermediate the side flanges 4 thereof. The pin 17 carries a rod 18 between flanges 5 which acts as a stop to prevent undue lateral movement. A depending element 19 is attached to pin 17, which when the cleat is placed, extends down into the space between the dual wheels as shown in Figure 6. The fastening chain 6 is secured to the end of element 19 and chain 7 is secured to base member 2 of the cleat intermediate the transverse members 3. Chain 6 passes through opening 16 in the outer wheel disc and secures the cleat by connection to chain 7 in the easily accessible space formed by the concave outer wheel disc 14.

Figures 1 and 6 show the blocking effect of the brake drum 20 on the inner wheel disc openings. The element 19 extending into the space between the tires provides stability even though the device is fastened only to the outer wheel and movement of the cleat on the tire surface is prevented.

Thus, the invention provides a simple mud cleat or shoe that covers both wheels of a dual wheel assembly, which is easily placed after the wheels are stuck or bogged and securely fastened by passing the fastening means between the wheels and thence through the readily accessible openings in the outer wheel disc. The intermediate positioning of the fastening means on the frame member and the bearing surfaces on both inner and outer wheel tires provide stability even though the cleat is fastened only to the outer wheel.

Advantageously, the frame member may be made up of pieces of angle iron welded, bolted or otherwise connected to provide the tread engaging base elements and traction-providing flanges. The fastening means attached to the cleat may be straps or cable with appropriate end connectors, but the above-described chain and hook arrangement is most flexible and universal for various wheel and tire sizes.

The mud cleat of the invention may be modified as described above, or otherwise, without departing from the invention or changing the advantageous basic structure and function. For instance, the vertical flanges 4 on the longitudinal base elements 2 may be eliminated, although they provide greater structural strength. Also additional flanges, disposed in a transverse or diagonal direction may be inserted within the frame member. Further, the shape of the cleat may be varied in that any polygonal form is satisfactory. However, the quadrilateral is a preferred form.

More than one cleat may be used on one dual wheel, and the cleat may be made of greater or lesser longitudinal dimension to cover a larger or smaller arc when placed on the dual wheel tires. Accordingly, the scope of the invention is to be defined by the appended claims and their equivalents in structure and function.

What I claim is:

1. In a dual wheel assembly comprising spaced wheel rims and tires, load supporting portions and openings in the outer of said portions, a traction device therefor comprising a polygonal frame member having longitudinal and transverse base elements providing tire-tread engaging surfaces, said transverse elements adapted to span the lateral dimension of said dual wheel, traction flanges carried by and extending upwardly from said base elements, and separate fastening means positioned intermediate the ends of said transverse base elements adapted to pass between said dual wheels and through said openings for securing said device to the outer of said dual wheels.

2. A device according to claim 1 in which the frame member is a diamond-shaped quadrilateral and the fastening means are secured to opposing points of said frame member.

3. A device according to claim 1 in which the fastening means are chains positioned at the midpoints of the transverse base elements, and chain hooks are positioned on the free ends of said chains.

4. A traction device for dual wheels comprising a frame member having longitudinal and transverse base elements providing tire tread engaging surfaces, traction flanges carried by and extending upwardly from said base elements, a longitudinal member pivoted in the flanges carried by said transverse base elements, and fastening means carried by said longitudinal element for securing said device to a dual wheel.

5. A device according to claim 4 in which the longitudinal member is pivoted at the midpoints of said transverse elements and carries a depending element adapted to pass between said dual wheels, and said fastening means is positioned on said depending element for securing said device to the outer wheel.

6. A device as claimed in claim 1 in which the longitudinal base elements of said frame member conform to the tire curvature.

7. In a dual wheel assembly comprising spaced wheel rims and tires, and discs with openings therein, a traction device therefor comprising a quadrilateral frame member having base elements providing tire-tread engaging surfaces, one pair of opposing base elements transversely extending across the lateral span of said dual wheels, traction flanges carried by and extending upwardly from said base elements, and separate fastening means positioned one on each of the transversely extending base elements intermediate the ends thereof, said fastening means adapted to pass between said dual wheels and through openings in the outer wheel discs for securing said device thereto.

References Cited in the file of this patent

UNITED STATES PATENTS

| 1,157,928 | Duff | Oct. 26, 1915 |
| 1,600,588 | Hipkins | Sept. 21, 1926 |
| 1,600,589 | Hipkins | Sept. 21, 1926 |
| 2,311,116 | Lau | Feb. 16, 1943 |

FOREIGN PATENTS

| 694,580 | Germany | Aug. 3, 1940 |

OTHER REFERENCES

German application Serial Number 14,425 printed March 22, 1956 (K63 e $20_{01}$).